(12) United States Patent
Godwin

(10) Patent No.: US 9,097,242 B2
(45) Date of Patent: Aug. 4, 2015

(54) LOW DIFFERENTIAL TEMPERATURE ROTARY ENGINES

(76) Inventor: Harold Emerson Godwin, Fergus (CA)

(*) Notice: Subject to any disclaimer, the term of this patent is extended or adjusted under 35 U.S.C. 154(b) by 434 days.

(21) Appl. No.: 12/990,743

(22) PCT Filed: May 15, 2009

(86) PCT No.: PCT/CA2009/000656
§ 371 (c)(1),
(2), (4) Date: Nov. 2, 2010

(87) PCT Pub. No.: WO2009/140752
PCT Pub. Date: Nov. 26, 2009

(65) Prior Publication Data
US 2011/0041499 A1    Feb. 24, 2011

Related U.S. Application Data

(60) Provisional application No. 61/054,136, filed on May 17, 2008.

(51) Int. Cl.
*F03G 3/04*     (2006.01)
*F03G 7/06*     (2006.01)
*F03G 7/10*     (2006.01)

(52) U.S. Cl.
CPC ... *F03G 7/06* (2013.01); *F03G 7/10* (2013.01)

(58) Field of Classification Search
CPC .............. F01K 1/14; F01K 25/08; F03B 7/00
USPC .................................... 60/639, 660, 671, 398
See application file for complete search history.

(56) References Cited

U.S. PATENT DOCUMENTS

| 389,515 | A | * | 9/1888 | Iske | 60/675 |
| 2,171,246 | A | * | 8/1939 | Schweiger | 40/479 |
| 2,513,692 | A | * | 7/1950 | Tubbs | 60/531 |
| 2,659,215 | A | * | 11/1953 | Massopust | 53/440 |
| 3,412,482 | A | * | 11/1968 | Kusmer | 434/300 |

(Continued)

FOREIGN PATENT DOCUMENTS

| DE | 534954 C | 9/1931 |
| GB | 2451660 A | 2/2009 |

*Primary Examiner* — Kenneth Bomberg
*Assistant Examiner* — Shafiq Mian
(74) *Attorney, Agent, or Firm* — Tai W. Nahm; Miller Thomson LLP

(57) ABSTRACT

An engine for extracting energy from a heat source, comprising a support, a shaft rotatably coupled to the support and being rotatable in a first direction, a plurality of vessels coupled to and spaced about the shaft, a working fluid provided in the plurality of vessels, and a plurality of conduits connecting the vessels together in a circuitous fluid circuit. Each conduit has an outlet end connected to one of the plurality of vessels, an inlet end connected to another one of the plurality of vessels, and a one-way check valve configured to allow the working fluid to flow out of the one vessel via the outlet end, through the conduit and into the another vessel via the inlet end. The plurality of vessels and conduits are shaped and arranged about the shaft and the working fluid is selected so that when the one vessel is heated by the heat source the working fluid in the one vessel experiences an increase in vapor pressure causing at least part of the working fluid to flow from the one vessel into the another vessel located above the one vessel so as to produce a gravitational moment that encourages rotation of the shaft in the first direction.

19 Claims, 13 Drawing Sheets

(56) References Cited

U.S. PATENT DOCUMENTS

| | | | | |
|---|---|---|---|---|
| 3,659,416 | A | * | 5/1972 | Brown ............................ 60/530 |
| 3,785,144 | A | * | 1/1974 | Fairbanks ....................... 60/531 |
| 4,051,678 | A | * | 10/1977 | Yates ............................ 60/641.6 |
| 4,311,015 | A | * | 1/1982 | Rust ............................... 60/675 |
| 4,333,314 | A | * | 6/1982 | Allen .............................. 60/675 |
| 4,385,497 | A | * | 5/1983 | Scott ............................. 60/639 |
| 4,440,427 | A | * | 4/1984 | Felton ........................... 290/54 |
| 5,772,474 | A | * | 6/1998 | Yagi et al. ..................... 439/660 |
| 5,823,478 | A | * | 10/1998 | Dunn ......................... 244/171.1 |
| 6,240,729 | B1 | * | 6/2001 | Yoo et al. ...................... 60/641.1 |
| 6,764,275 | B1 | * | 7/2004 | Carr ................................. 415/1 |
| 6,892,539 | B2 | * | 5/2005 | Jarman ........................ 60/641.8 |
| 7,004,847 | B2 | * | 2/2006 | Henry ........................... 472/128 |
| 7,074,534 | B2 | * | 7/2006 | Herron et al. ................... 430/76 |
| 7,150,670 | B2 | | 12/2006 | Doran |
| 7,222,487 | B1 | * | 5/2007 | Hinkley ......................... 60/639 |
| 7,462,949 | B2 | * | 12/2008 | Coman ........................... 290/54 |

\* cited by examiner

LOW DIFFERENTIAL TEMPERATURE ROTARY ENGINES

CROSS-REFERENCE TO RELATED APPLICATIONS

This application claims the benefit of U.S. Provisional Application No. 61/054,136, filed May 17, 2008, the entirety of which is incorporated herein by reference.

TECHNICAL FIELD

The embodiments described herein relate to extracting energy from low differential temperature sources, and more specifically, to systems, apparatus, and methods for generating power from low differential temperature sources.

INTRODUCTION

Extraction of energy from low differential temperature sources, such as water heated by solar, geothermal, or industrial processes, and conversion of this energy to rotational or other forms of energy is often inefficient or impractical.

A number of attempts have been made to provide apparatus that make the energy extraction more practical. For example, Gould (U.S. Pat. No. 4,570,444) describes a solar-powered motor with a wheel-like rotor having a rim separated into hollow compartments. The rotor is designed to revolve around a horizontal axis while containing a volatile liquid in some of its rim compartments. The rotor has a hub, also with separate compartments, and hollow spokes interconnecting the hub with the rim compartments. The interior of the rotor is designed to receive a compressed gas in its hub and sequentially route it, through the hollow spokes, to rim compartments on one side of the rotor axis. When the compressed gas makes contact with the liquid surface in that part of the rim it exerts pressure on that surface. The pressure on the liquid surface forces the liquid to the opposite side of the rotor and into the rim, through an interconnecting series of passageways in the spokes and hub, at a level higher than its original level. This results in an imbalance of weight on one side of the rotor that causes the rotor to turn or rotate under the influence of gravity in a direction tending to restore its weight balance. The rotor continues to rotate as long as the compressed gas is fed into its hub. The compressed gas can be the vapor phase of the volatile liquid in the rotor.

Yoo, et al. (U.S. Pat. No. 6,240,729) on the other hand describes an apparatus for converting thermal energy to mechanical motion including a frame mounted onto an axle above a heat source. A flow circuit including at least three elongate chambers connected by fluid conduits is mounted onto the frame, and one-way valves provided in the flow circuit permit one-way fluid flow within the flow circuit. The heat source heats a motive fluid contained within the chambers beyond its boiling point, which increases the vapor pressure within the heated chamber, thereby forcing fluid out of the chamber and into the chamber immediately downstream in the flow circuit. The increased weight of the downstream chamber creates a torque about the axle, rotating the frame in an upstream direction.

Furthermore, Iske (U.S. Pat. No. 243,909) describes in a motor, a straight tube having a receptacle at each end and allowing the passage of enclosed volatile liquid from one receptacle to the other under the action of heat.

There remains a need for improved apparatus for extracting energy from low differential temperature sources.

SUMMARY

According to one aspect, there is provided an engine comprising a support and a rotary part. The rotary part comprises a connected arrangement of vessels and conduits having a liquid-vapour mixture (e.g. working fluid) provided therein. Each conduit has a one-way check valve. Each vessel is connected to another vessel by a conduit in an alternating fashion about the shaft resulting in a circuitous path for vapour to pressurize and push fluid from a low vessel to a higher vessel when the lower vessel is heated by a heat source (e.g. radiant, conductive, convective, or any combination thereof). The rotary part rotates as a result of potential energy of the fluid in the higher vessel and power can be taken from the engine through a connected rotational member.

According to another aspect there is provided an engine comprising a wheel-like assembly connected to a support. The wheel-like assembly has a shaft rotatably connected to the support, the shaft being rotatable in a first direction (e.g. clockwise or counter-clockwise) and located above a heat source. A plurality of vessels are arranged about the shaft, each vessel having a gravitational moment with respect to the shaft. A plurality of conduits connect the vessels together. At least one conduit is directly or indirectly connected to the shaft. Each vessel is connected to an inlet conduit and an outlet conduit. The inlet conduit has at least one one-way check valve. Each vessel also includes a gas trap therein. In some embodiments, the outlet conduit extends into the vessel to define the gas trap inside the vessel.

The vessels are arranged about the shaft and the vessels and conduits are connected such that when each vessel is heated by the heat source (which in some cases could be below the shaft but could be in other locations), the outlet conduit of that vessel is the inlet conduit of a higher vessel having or nearly having a clockwise (or counter-clockwise) gravitational moment. The interior of the vessels and conduits contains a liquid-vapour mixture (e.g. working fluid).

The working fluid in at least one vessel near the heat source is heated thereby increasing gas pressure inside the gas trap and forcing fluid through the connected outlet conduit, through the one-way check valve, and into the connected higher vessel thereby causing the wheel-like assembly to rotate clockwise (or counter-clockwise depending on the configuration). Power may be available from a rotational member connected to wheel-like assembly. In some embodiments, cooled fluid may also be available as an output from the system.

According to another aspect, there is provided an engine for extracting energy from a heat source, comprising: a support; a shaft rotatably coupled to the support and being rotatable in a first direction; a plurality of vessels coupled to and spaced about the shaft; a working fluid provided in the plurality of vessels; and a plurality of conduits connecting the vessels together in a circuitous fluid circuit, each conduit having an outlet end connected to one of the plurality of vessels, an inlet end connected to another one of the plurality of vessels, and a one-way check valve configured to allow the working fluid to flow out of the one vessel via the outlet end, through the conduit and into the another vessel via the inlet end; wherein the plurality of vessels and conduits are shaped and arranged about the shaft and the working fluid is selected so that when the one vessel is heated by the heat source, the working fluid in the one vessel experiences an increase in vapour pressure causing at least part of the working fluid to flow from the one vessel into the another vessel located above the one vessel so as to produce a gravitational moment that encourages rotation of the shaft in the first direction.

The plurality of vessels may comprise at least a first vessel, a second vessel and a third vessel; the plurality of conduits may include a first conduit having an outlet end connected to the first vessel and an inlet end connected to the second vessel, and a second conduit having an outlet end connected to the second vessel and an inlet end connected to the third vessel; wherein the vessels are arranged around the shaft so that when the first vessel is heated by the heat source, the second vessel is located above the first vessel and the working fluid in the first vessel experiences an increase in vapour pressure, causing at least part of the working fluid to flow upwards through the first conduit into the second vessel so as to encourage rotation of the shaft in the first direction; and wherein when the second vessel is heated by the heat source, the third vessel is located above the second vessel and the working fluid in the second vessel experiences an increase in vapour pressure, causing at least part of the working fluid to flow upwards through the second conduit and into the third vessel so as to encourage rotation of the shaft in the first direction.

In some embodiments, the shaft defines a vertical engine plane and the vessels are arranged about the shaft so that when the first vessel is heated by the heat source, the second vessel is located in a position with respect to the vertical engine plane so as to encourage rotation of the shaft in the first direction.

In some embodiments, each vessel has a gas trap therein in which the working fluid will be received from the previous vessel when the previous vessel experiences the increase in vapour pressure. The outlet end of each conduit may extend into the another vessel so as to define the gas trap therein.

In some embodiments, the conduits include tubular structural members configured to couple the vessels to each other and to the shaft.

The plurality of vessels may comprise at least five vessels. The plurality of vessels may comprise at least seven vessels.

In some embodiments, the first vessel and second vessel are non-adjacent.

In some embodiments, the conduits have an alternating pattern that criss-crosses back and forth about the shaft.

In some embodiments, cooling fluid tends to cool the working fluid therein as the working fluid flows from the one vessel to the another vessel. The engine may further comprise a drum having a cooling fluid therein, and wherein the conduits engage with the drum so the cooling fluid tends to cool the working fluid flowing therethrough. The cooling fluid may be recirculated through the drum.

The engine may further comprise a rotational member coupled to at least one of the shaft, the conduits and the vessels, the rotational member configured to rotate with the vessels. The rotational member may be a drum connected to at least one conduit. The rotational member may be an annular member connected to at least one vessel. The annular member may have gear teeth for meshing with a gear.

In some embodiments, the engine further comprises a rotational member coupled to at least one of the shaft, the conduits and the vessels, the rotational member configured to rotate with the vessels.

In some embodiments, the working fluid comprises two or more different fluids. The working fluid may include a density-increasing additive. The working fluid may include an additive selected to modify the boiling point of the working fluid.

In some embodiments, each vessel comprises material selected to delay or hasten heating of the working fluid therein until the vessel is located at a desired position in relation to the heat source.

In some embodiments, the heat source includes a plurality of heat sources.

In some embodiments, each conduit has two or more one-way check valve provided therein, the two or more one-way check valves arranged to manage thermal and flow characteristics of the working fluid as it moves between vessels.

In some embodiments, the heat source is a liquid heat source, and wherein rotation of the vessels selectively at least partially submerges at least one of the vessels in the liquid heat source thereby causing a buoyancy force to be exerted on that vessel.

In some embodiments, at least one of the vessels has fins thereon to facilitate the transfer of heat energy between at least one of the heat source and the ambient air.

In some embodiments, the heat source includes at least one of a radiant heat source, a conductive heat source, and a convective source. The heat source may be a flowing fluid or a non-flowing fluid.

In some embodiments, the heat source is located below the shaft.

In some embodiments, wherein the plurality of conduits include flexible hoses.

In some embodiments, the vessels are spaced apart by a similar radial distance from the shaft. The vessels may be evenly spaced about the shaft.

In some embodiments, the vessels are spaced apart by a dissimilar radial distance from the shaft. The vessels may be unevenly spaced about the shaft.

In some embodiments, the vessels are made of a thermally conductive material. In some embodiments, the vessels are made of a thermally insulative material. The vessels may be made of a composite material.

In some embodiments, the engine is configured to be used to generate at least one of electrical, thermal, and mechanical power.

In some embodiments, the engine is configured to provide cooling of the heat source.

In some embodiments, air is removed from the vessels. The air may be removed from the vessels using at least one of a vacuum or a venting system.

In some embodiments, the engine further comprises a flywheel connected to at least one of the vessels, the conduits and the shaft.

According to another aspect, there is provided an engine for extracting energy from a heat source, comprising: a support; a shaft rotatably coupled to the support; and a plurality of vessel assemblies coupled to the shaft, each vessel assembly comprising: a plurality of vessels coupled to and spaced about the shaft; a working fluid provided in the plurality of vessels; and a plurality of conduits connecting the vessels together in a circuitous fluid circuit, each conduit having an outlet end connected to one of the plurality of vessels, an inlet end connected to another one of the plurality of vessels, and a one-way check valve configured to allow the working fluid to flow out of the one vessel via the outlet end, through the conduit and into the another vessel via the inlet end; wherein the plurality of vessels and conduits are shaped and arranged about the shaft and the working fluid is selected so that when the one vessel is heated by the heat source, the working fluid in the one vessel experiences an increase in vapour pressure causing at least part of the working fluid to flow from the one vessel into the another vessel located above the one vessel so as to produce a gravitational moment that encourages rotation of that vessel assembly in a particular direction.

The plurality of vessels may include at least a first vessel, a second vessel and a third vessel; the plurality of conduits may include a first conduit having an outlet end connected to the first vessel and an inlet end connected to the second vessel, and a second conduit having an outlet end connected to the second vessel and an inlet end connected to the third vessel; wherein the vessels are arranged around the shaft so that when the first vessel is heated by the heat source, the second vessel is located above the first vessel and the working fluid in the first vessel experiences an increase in vapour pressure, causing at least part of the working fluid to flow upwards through the first conduit into the second vessel so as to encourage rotation of that assembly in the particular direction; and wherein when the second vessel is heated by the heat source, the third vessel is located above the second vessel and the working fluid in the second vessel experiences an increase in vapour pressure, causing at least part of the working fluid to flow upwards through the second conduit and into the third vessel so as to encourage rotation of that assembly in the particular direction.

In some embodiments, each of the plurality of assemblies further comprises a coupling connected to the shaft, the couplings configured to allow at least one of the assemblies to rotate in an opposing direction to the other assemblies.

In some embodiments, the plurality assemblies is configured to rotate two or more rotational members from which power can be taken The two or more rotational members may be configured to rotate at one or more of different speeds, different torques, and different power outputs.

In some embodiments, at least two of the plurality of assemblies have different working fluids therein.

In some embodiments, the plurality of assemblies includes a first assembly and a last assembly, and wherein the first assembly is configured to be heated by the heat source when the heat source has a first temperature, and the last assembly is configured to be heated the heat source when the heat source has a second temperature. The second temperature may be less than the first temperature.

In some embodiments, the working fluid in the first assembly is selected to have a first boiling temperature near the first temperature, and the working fluid in the last assembly is selected to have a second boiling temperature near the second temperature.

The engine may further comprise a trough defining a plurality of channels having the heat source therein, and wherein each of the plurality of assemblies is configured to engage one of the channels in the trough. At least some of the channels of the trough may be arranged in a switchback pattern. In some embodiments, the heat source flows along the channels in the trough, and at least one assembly in at least one of the channels rotates in the same direction as the flow of the heat source therein. In some embodiments, the heat source flows along the channels in the trough, and at least one assembly in at least one of the channels rotates in the opposite direction as the flow of the heat source therein.

In some embodiments, the engine further comprises a flywheel connected to at least one of the assemblies.

In some embodiments, the engine is configured to be used to generate at least one of electrical, thermal, and mechanical power.

BRIEF DESCRIPTION OF THE FIGURES

The drawings included herewith are for illustrating various examples of methods and apparatus of the present specification and are not intended to limit the scope of what is taught in any way. In the drawings.

DETAILED DESCRIPTION

Figure 1:
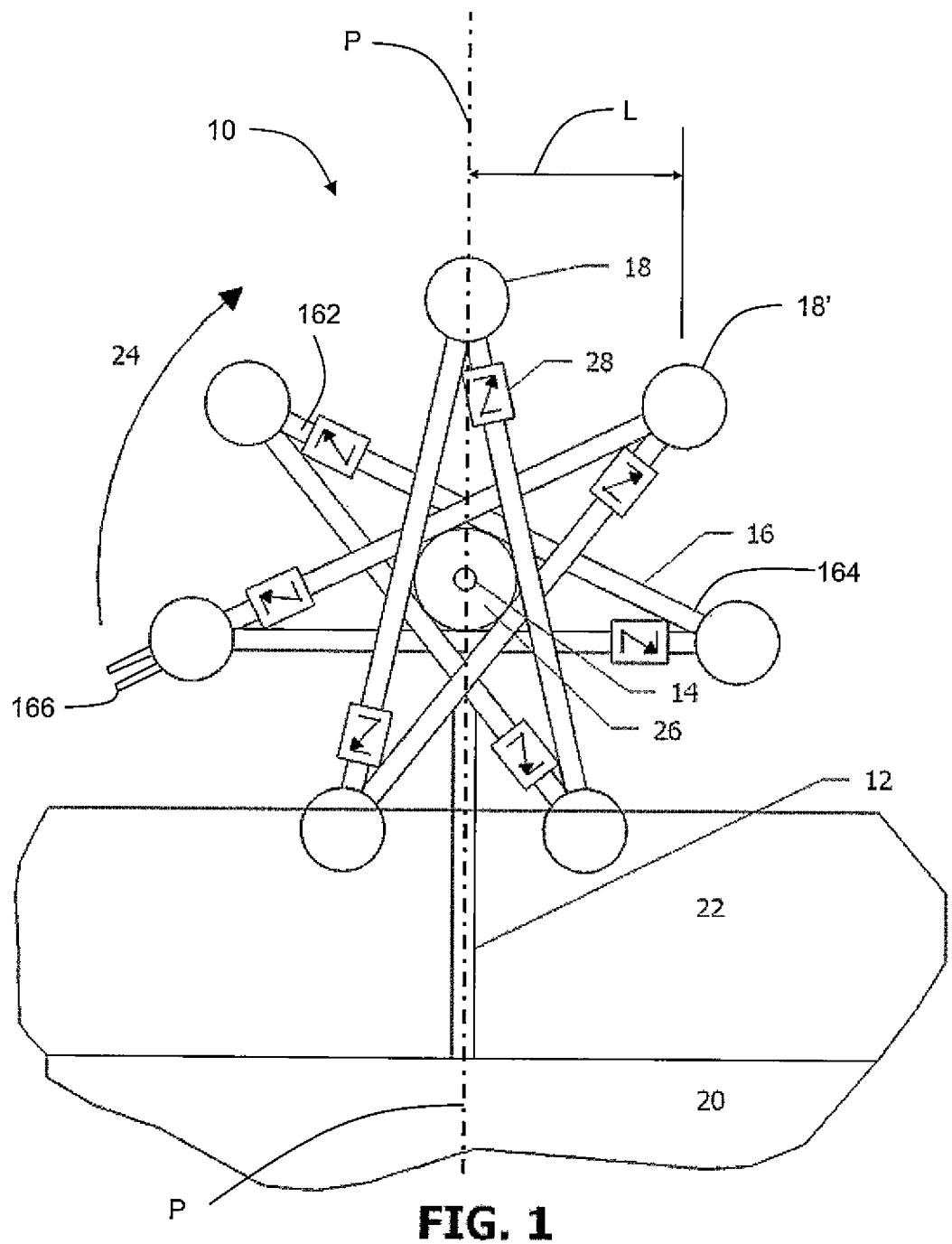
FIG. 1 is a schematic view of an engine for extracting energy from a heat source according to one embodiment.

Turning now to FIG. 1, illustrated therein is an engine according to one embodiment. The engine generally includes a support 12 a shaft 14, and a plurality of vessels 18 interconnected together by conduits 16 in a spaced relationship about the shaft 14.

As shown, the support 12 generally extends upwardly from and may be affixed to a base 20, such as the bottom of a tank or a ground surface. Alternatively, the engine 10 could also be supported from other directions (e.g. from above or suspended from an elevated surface, such as by using brackets).

Provided near the base 20 is a heat source 22, which could be a liquid heat source. In some embodiments, the heat source 22 may be at rest (e.g. the liquid is still) or the heat source 22 be flowing (e.g. the liquid is moving). Some examples of heat sources 22 could include water or other liquids warmed by industrial or residential processes (e.g. warm waste water), solar heating, geothermal heating, ocean thermal heating, biomass heating, or other sources of waste heat. Other examples could include hot exhaust gases, or other gas streams.

The heat source 22 typically offers a low differential temperature with respect to a cooling reservoir, such as the ambient atmosphere adjacent the engine 10. For example, if the heat source 22 is taken from geothermal heat at 15 degrees Celsius (59 degrees F.), the cooling reservoir could be the ambient atmosphere during a North American winter season having a temperate of −20 Celsius (−4 degrees F.), providing a low temperature differential of approximately 35 degrees Celsius (63 degrees F.).

In another example, the heat source 22 could be water heated by the sun (e.g. to 40 degrees Celsius (104 degrees F.)) and the cooling reservoir could be cold groundwater (e.g. from a source at 15 degrees Celsius (59 degrees F.)), providing a low temperature differential (e.g. in this example approximately 25 degrees Celsius (45 degrees F.)).

As shown in FIG. 1, the shaft 14 is rotatably connected to the support 12 (e.g. using bearings, bushings or other suitable coupling members) and rotates about an axis that is generally at least substantially perpendicular to the direction of gravity. The shaft 14 also generally defines a vertical engine plane P, as shown in FIG. 1. As shown, the shaft 14 may be located above the heat source 22.

The shaft 14 is rotatable in at least a first direction 24 (shown here as a clockwise direction). Alternatively, the shaft 14 may be rotatable in another particular direction (e.g. counter-clockwise) where desired. The directions counter-clockwise and clockwise as referred to herein are generally relative to the position of observer observing the operation of the engine 10 and are in no way meant to be limiting.

The shaft 14 is an example of a rotational member from which power can be extracted, as will be described in additional detail below.

The engine 10 also includes a plurality of vessels 18 that are positioned in a spaced arrangement about the shaft 14 (shown here being equally spaced). Each vessel 18 generally has a gravitational moment with respect to the shaft 14 as defined by the product of the weight of that vessel 18 and its contents (e.g. acting downwards) and the horizontal distance between the vertical engine plane P and the center of gravity of that vessel 18. For example, a particular vessel 18' is spaced at a distance L from the vertical engine plane P.

It will be appreciated that the gravitational moment for a particular vessel 18 may in some instances be zero (e.g. where that particular vessel 18 is located directly above or below the shaft 14 so that the horizontal distance L is zero).

The gravitational moments of the vessels 18 on the left side of the shaft 14 (as shown in FIG. 1) tend to rotate the engine 10 counter-clockwise, while the gravitational moments of the vessels 18 on the right side of the shaft 14 tend to rotate the engine 10 clockwise (e.g. in the first direction 24). As described in greater detail below, the engine 10 is designed so that when the vessels 18 are on the one side of the vertical engine plane P (e.g. on the right side thereof), they are heavier (e.g. contain more liquid) as compared to vessels 18 on the other side of the vertical engine plane P (e.g. on the left side thereof), resulting in a net moment that drives the engine 10 in the first direction 24 (e.g. clockwise in this example, but which could be counter-clockwise in other examples).

The vessels 18 are connected together by the conduits 16 in a circuitous fluid circuit. In some embodiments, at least one of the conduits 16 may be directly or indirectly connected to the shaft 14. For example, as shown in FIG. 1, the conduits 16 are connected to a central disc 26, and the central disc 26 is in turn connected to the shaft 14.

In other embodiments, the central disc 26 could be replaced by a drum member or a frame, or the vessels 18 could be secured to the shaft 14 using various other structural members that are not conduits 16.

As shown, each vessel 18 is directly connected to two other vessels 18 via two conduits 16. Each conduit 16 generally has an inlet end 162 that acts as an inlet conduit (e.g. for providing fluid to that particular vessel 18) and an outlet end 164 that acts and an outlet conduit (allowing for fluid to be extracted from that particular vessel 18), as will be described in greater detail below.

As shown, each conduit 16 may have one or more one-way check valves 28 provided therein. In some embodiments, the check-valves may be located near the inlet end 162 of each vessel 18 that the conduit 16 feeds fluid to. In some embodiments, additional one-way check valve(s) can be spaced along each conduit 16 and may help to control flow and thermal management of the fluid passing through the conduits 16.

As will be described in additional detail below, each outlet conduit 164 can extend into one of the vessels 18 so as to define a gas trap inside that vessel 18 (see for example FIG. 3a). Generally, the inlet conduit 162 connected to one vessel 18 is opposite the outlet conduit 164 connected to another vessel 18 and all the vessels 18 are linked together such that a circuitous path of alternating vessels 18 and conduits 16 is provided (e.g. all vessels are in fluid communication with each other).

In general language, the alternating and circuitous path of the conduits 16 and vessels 18 can be described as follows, with each vessel 18 being coupled together so as to provide working fluid to another vessel 18, which can be a non-adjacent vessel. In some embodiments, each vessel 18 is coupled so as to provide working fluid to a non-adjacent vessel 18. For example, as shown in FIG. 2c, vessel "A" is coupled to and can provide working fluid to vessel "E" using a first conduit 16a, with the vessel "E" being generally on the other side of the shaft 14 from vessel "A". This generally gives the conduits 16 an alternating pattern that may criss-cross back and forth about the shaft 14.

The vessels 18, conduits 16, and shaft 14 generally form a wheel-like assembly that can rotate with respect to the support 12.

As can be seen in FIG. 1, the vessels 18 are arranged about the shaft 14 in a spaced relationship, with the vessels 18 and conduits 16 connected together such that when each vessel 18 is heated by the heat source 22, the outlet conduit 164 of that vessel 18 is the inlet conduit 162 of a second vessel 18 that is above that vessel 18, and which has (or nearly has) a clockwise gravitational moment so as to drive the engine 10 in the first direction 24.

Many such arrangements are possible, and the depicted geometric arrangement (with seven evenly angularly spaced vessels 18 and seven conduits 16 as shown in FIG. 1) is merely one example and is not meant to be limiting. In particular, the vessels 18 need not be the same radial distance from the shaft 14, nor do they need to be evenly spaced about the shaft 14, nor do the conduits 16 need to be straight.

The interior of the vessels 18 and conduits 16 generally contains a working fluid (e.g. a liquid-vapour mixture). For example, the fluid could be a mixture of a liquid alcohol (e.g., ethanol or methanol) and alcohol vapour. Other fluids and liquids, such as ammonia, water, petroleum ether, benzine, pentane-n, diethyl ether, dimethyl ether, methyl acetate, methyl iodide, ether, ethyl bromide, methanol, hexane, acetone, butane-n, carbon disulfide, bromine, chloroform, acetaldehyde, and Freon refrigerant R-11 may also be suitable.

Generally, the boiling point of the working fluid (e.g. the liquid-vapour mixture) is selected depending on the expected temperature of the liquid heat source 22 that will be used to drive the engine 10. In particular, the working fluid is normally selected so that the working fluid experiences an increase in vapour pressure when subjected to the heat source 22. In some embodiments, the working fluid is selected to have a boiling point that is around or near to the temperature of the heat source 22. For example, the boiling point of the working fluid may be selected to be slightly lower than, approximately equal to, or slightly higher than the temperature of the heat source 22.

In some embodiments, the working fluid (e.g. liquid-vapour mixture) can be provided to the vessels 18 and conduits 16 as a liquid. Residual air within the vessels 18 and conduits 16 may be left therein, or alternatively may be removed (e.g. using a vacuum or venting system), which may facilitate vaporization of the working fluid. In some embodiments, the working fluid (e.g. liquid-vapour mixture) can be selected and configured according to one or more specific ranges of differential temperatures that may be used to drive the engine 10.

Generally, for a particular vessel 18 to be affected by the heat source 22 to drive the engine 10, that vessel 18 should move near enough to the heat source 22 (and may become at least partially or fully immersed within the heat source 22) so that the vessel 18 will be heated by the heat source 22 and the liquid-vapour mixture inside the vessel 18 warms and vaporizes or boil so as to achieve increased vapour pressure in that particular vessel 18. As describe herein, the terms boiling and vaporizing are generally equivalent.

As the liquid in a particular vessels 18 near the heat source 22 vaporizes, this increases the pressure inside a gas trap within the vessel 18, forcing liquid through the connected outlet end 164 of the conduit 16. Liquid from that vessel 18 then flows upwards through the conduit 16, passing through the one-way check valve 28, and then into the interconnected higher vessel 18 via the inlet conduit 162. This increases the total potential energy of the liquid mass (e.g. by converting heat energy into potential energy), and this potential energy can then be converted to kinetic energy for driving the engine 10.

In particular, the movement of the working fluid from the lower vessel 18 to the higher vessel 18 causes the wheel-like assembly to rotate in the first direction 24 (e.g. clockwise). Energy can then be extracted from the shaft 14 in any number of suitable ways (e.g. mechanically using gears, belts, electrically by coupling the shaft 14 to a generator, and so on).

As shown in FIG. 1, the higher vessel 18 may be on the one side (e.g. the right side) of the vertical engine plane P defined by the shaft 14 so that the gravitational moment generated by the weight of the higher vessel 18 (and the weight of the fluid therein) acts in the first direction 24 (e.g. clockwise).

It will be understood that, in some embodiments, if the wheel-like assembly has enough rotational inertia, the higher vessel 18 may only be near to having a clockwise gravitational moment when receiving the fluid therein. That is, the higher vessel 18 may in fact have a small counter-clockwise gravitational moment when it receives the incoming liquid (e.g. the higher vessel 18 may be on either side of the vertical engine plane P), since the rotational inertia of the wheel-like assembly will tend to carry the vessel 18 from the left hand side to the right side of the shaft 14 as this happens.

In some embodiments, the timing of the arrival of the fluid to the higher vessel 18 can be selected to increase and in some cases maximize the energy output of the engine 10.

Figure 2A:
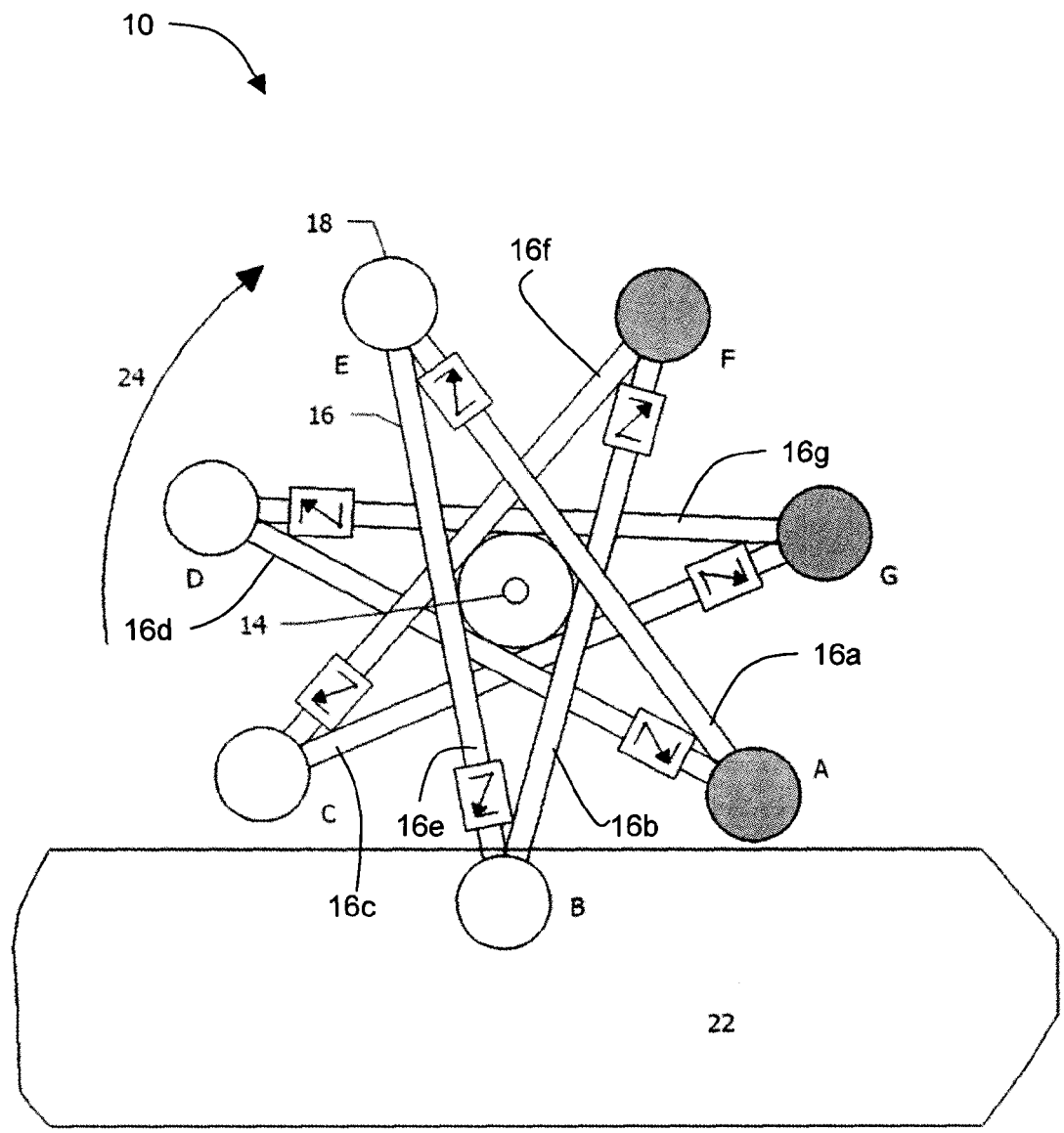
FIGS. 2a-c are schematic views of the engine of FIG. 1 at various stages during operation of the engine.
Figure 2B:
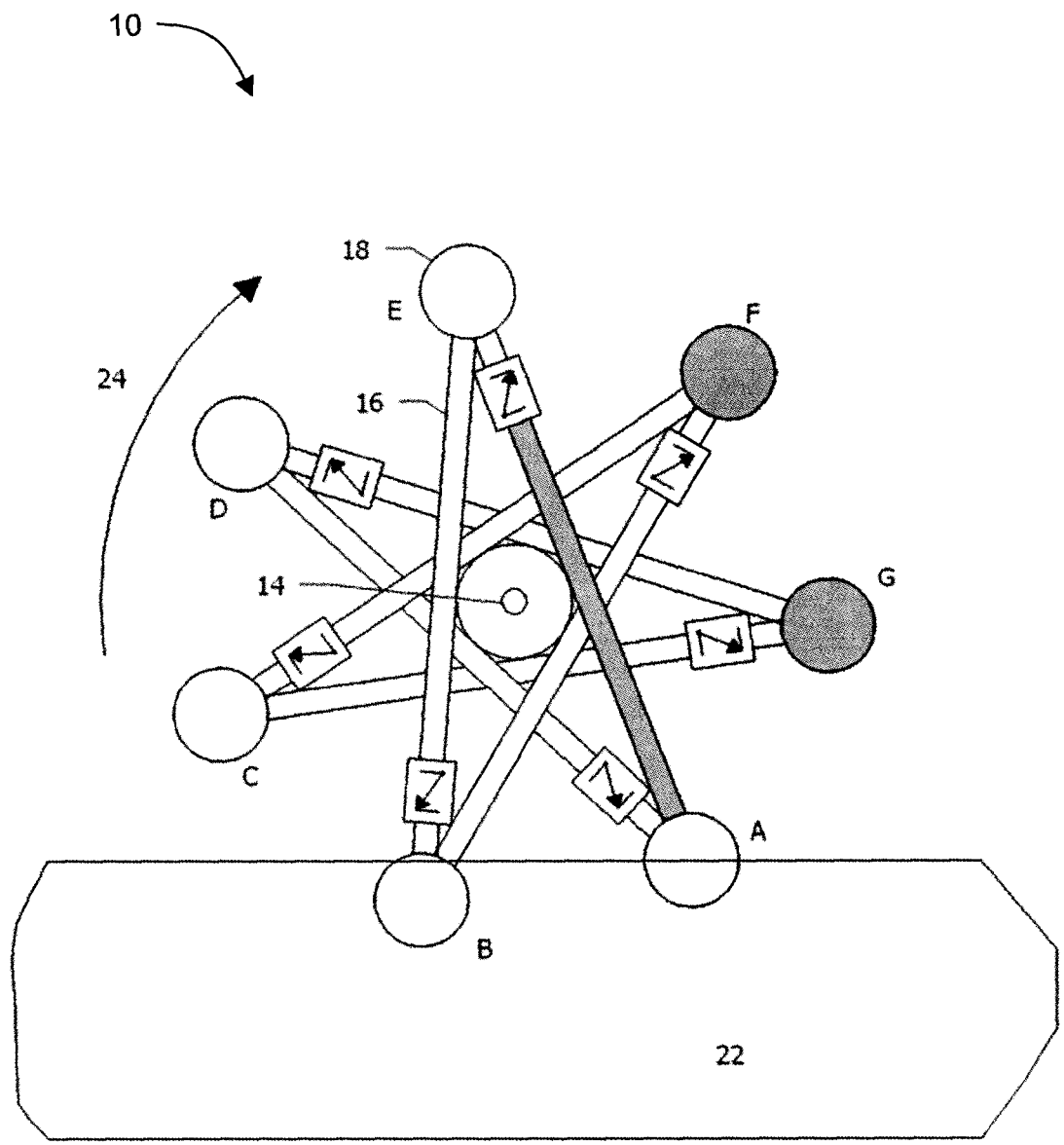
Figure 2C:
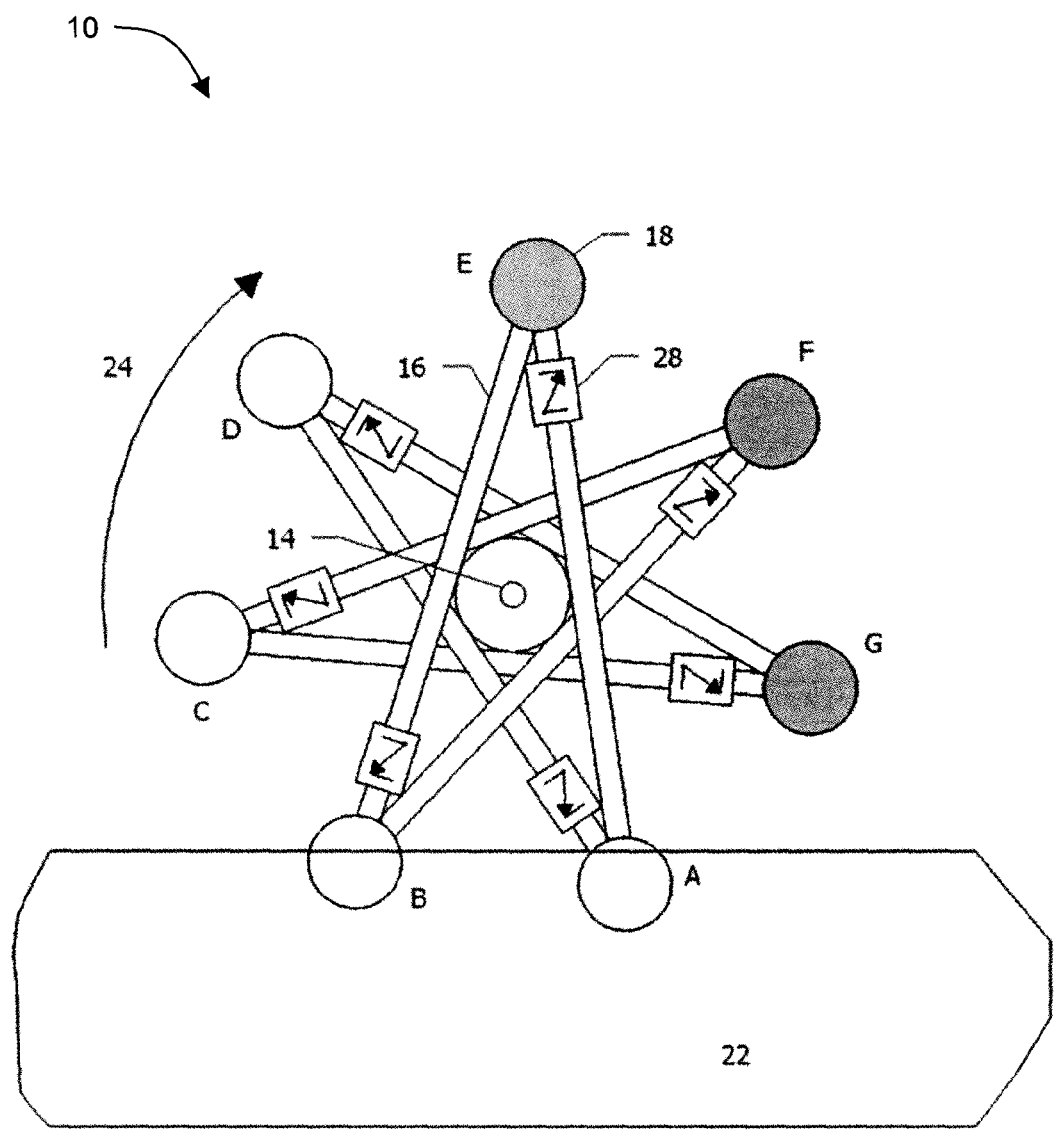

Turning now to FIGS. 2a-c, the motion of the engine 10 and the movement of the working fluid at several points is illustrated. Generally, vessels "A", "B", "C", "D", "E", "F" and "G" are coupled together by conduits 16a, 16b, 16c, 16d, 16e, 16f, and 16g as shown.

In these figures, liquid inside the vessels 18 and conduits 16 is schematically represented by shaded or darkened areas. The shaded vessels 18 and conduits 16 need not be full of liquid, but will normally contain a substantial amount of liquid therein.

Figure 3A:
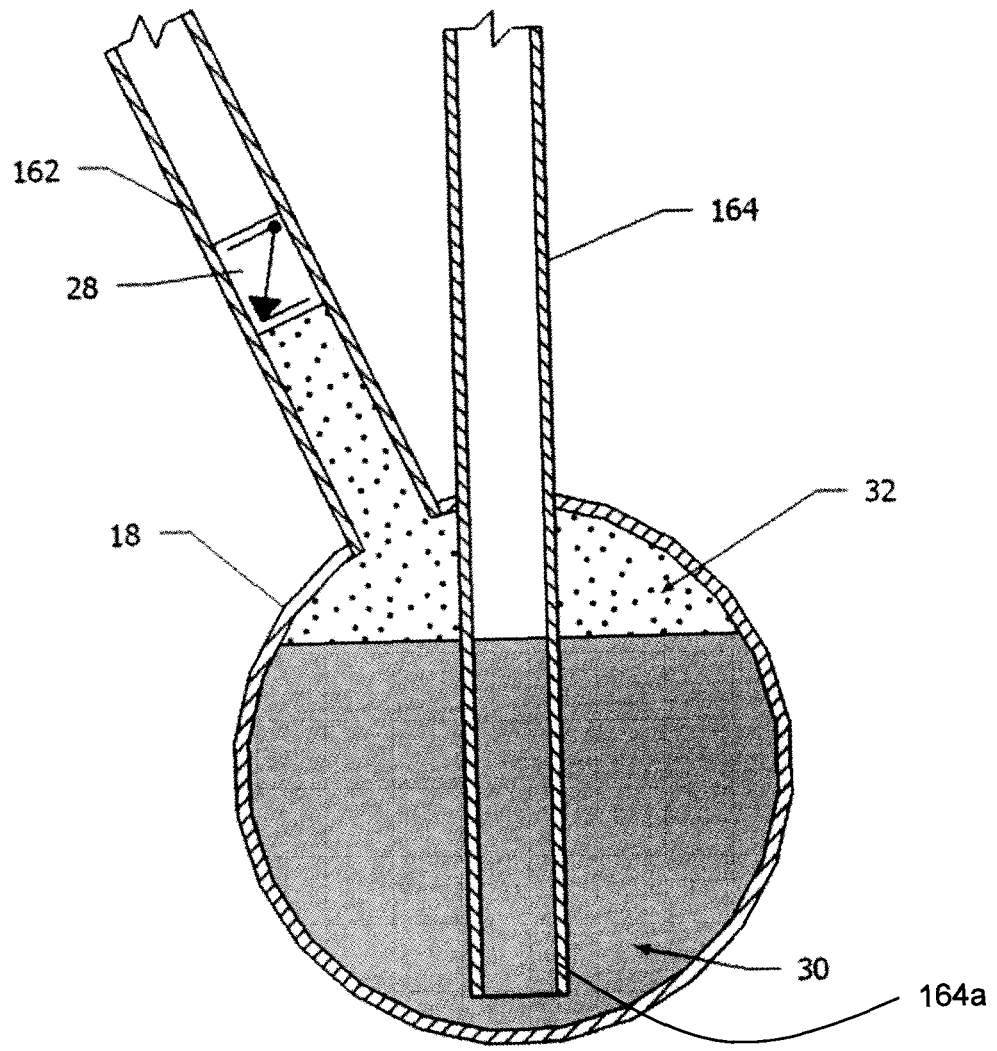
FIGS. 3a-b are cross-sectional views of a lower vessel and its connected conduits of the engine of FIG. 1.
Figure 3B:
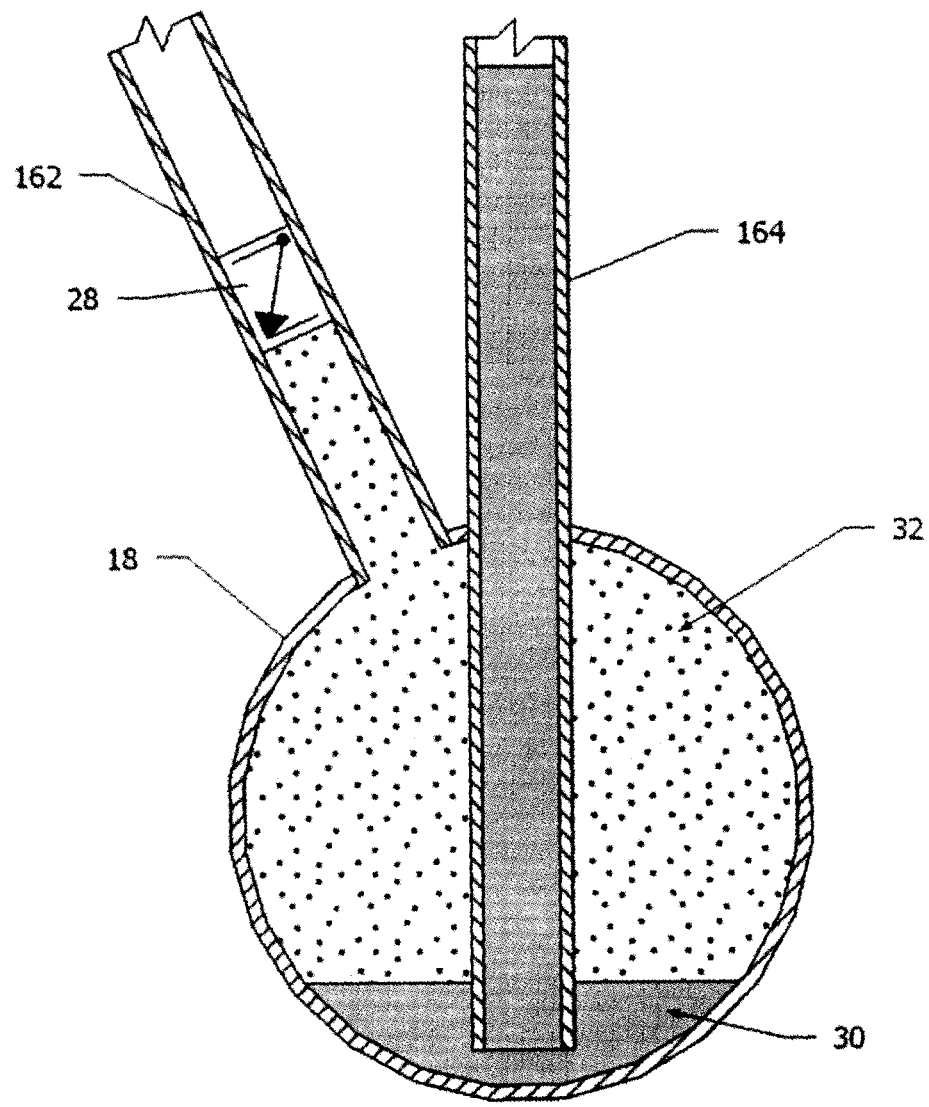

Similarly, vapour or gas inside the vessels 18 and conduits 16 is represented by dotted regions, as shown in FIGS. 3a and 3b, for example. The dotted regions may not be entirely liquid-free, but may contain some liquid therein.

Other regions are left white, which generally indicates that these regions have substantially less liquid and vapour (although they may include small amounts of liquid or vapour).

In FIG. 2a, the engine 10 is rotating in the first direction 24 (e.g. clockwise in this example), and vessel "A" is approaching the heat source 22, which could be warm waste water, for example. At this point, all vessels except vessel "B" are exposed to ambient air that is generally cooler than the heat source 22.

Vessel "B" is immersed in the heat source 22, but is at this point may be mostly free of liquid. Since vessel "B" is slightly to the left of the vertical engine plane P, any upward buoyancy force exerted by the heat source 22 on vessel "B" will tend to result in a clockwise moment, thereby further aiding rotation of the engine 10 in the first direction 24.

At this point in time vessels "F" "G" and "A" may all have a substantial amount of liquid therein. The weight of this liquid therein results in another clockwise moment that further encourages the engine 10 to rotate in the first direction 24.

In some cases, the total gravitational moment generated by vessels "F" "G" and "A" may be larger than the buoyancy moment generated by vessel "B".

In FIG. 2b, the rotation of the engine 10 has continued so as to partially immerse vessel "A" within the heat source 22. The vessel "A" is now being heated by the heat source 22 (although immersion is not required for the vessel "A" to be heated), and boiling/vaporization of the liquid inside vessel "A" is underway, resulting in increased pressure in vessel "A". This increased pressure which forces some of the liquid into the first conduit 16a between vessel "A" and vessel "E" (as indicated by the shading). At this point in time, the buoyancy of vessel "B", the weight of the liquid in the vessels "F" and "G", and the weight of any remaining liquid in the vessel "A" and its output conduit 16 continue to encourage movement of the engine 10 in the first direction 24.

In FIG. 2c, the vessel "A" is now nearly totally immersed in the heat source 22. At this point, at least a substantial portion of the liquid in vessel "A" has been forced through the conduit 16a, past the check valve 28, and into the vessel "E". The weight of the liquid inside vessels "E" "F" and "G" causes a gravitational moment that continues to drive the engine 10 in the first direction 24.

The result of movement of liquid from vessel "A" to vessel "E" is that the potential energy of the engine 10 is increased, thereby providing for rotation of the engine 10. In other words, the redistribution of liquid caused by the boiling within the vessels 18 results in a generally continuous moment on the engine 10 acting in the first direction 24 (e.g. clockwise).

It should be noted that in some cases, as shown in FIG. 2c, the net buoyancy moment from vessel "A" may act against the first direction 24 (e.g. in the counter-clockwise direction), which tends to inhibit the rotation of the engine 10 in the first direction 24. However, in some embodiments, this effect can be reduced or minimised by timing the exposure of vessel "A" to the heat source 22 and the resulting boiling of the liquid in vessel "A".

The cycle continues as vessel "G" approaches the warm water 22. At the same time, vessels "B" "C" and "D" undergo cooling (e.g. by exchanging heat with the surrounding ambient air and/or via evaporative cooling where residual liquid from the heat source 22 on the vessels "B", "C" and "D" may evaporate). The cooling allows vessels "B", "C" and "D" to acquire a temperature less than the temperature of the heat source 22, and generally prevents the entire engine 10 from reaching the same or substantially similar temperature as the heat source 22, which could cause the engine 10 to stall.

During a start up phase (e.g. when the engine 10 begins to move after being at rest), the engine 10 may initially rotate fairly slowly, but may accelerate until a steady state speed is achieved. This steady state speed is generally reached when a balance occurs between the force of gravity acting on the vessels 18 (including the liquid therein), the buoyancy forces acting on any submerged or partially submerged vessels 18, frictional forces on the shaft 14, resistance of the heat source 22 on the vessels 18 (e.g. drag force) and any other components moving through the heat source 22, atmospheric drag forces acting on the vessels 18 and other components moving through the ambient atmosphere, and other losses and resistance on the shaft 14 (or other members) resulting from by taking power off the engine 10.

When operating at a steady state speed, the balance between forces tends to be maintained, and as a result the engine 10 may change speeds because of a change in power demand, changing temperature of the heat source 22, and so on. The inertia of the rotating parts of the engine 10 (and which could include a fly wheel), tend to dampen the acceleration or deceleration of the engine 10 caused by transient changes in this balance and provide for more uniform rotational of the engine 10.

Stopping the engine 10 from rotating can be accomplished by removing the engine 10 from the heat source 22, and vice versa. For example, the engine 10 could be raised out of the heat source 22 (or the heat source 22 could be lowered so as to not be contacting the engine 10).

Alternatively, where the heat source 22 is warm waste water, the input flow of new warm water to the heat source 22 could be stopped so that the heat source 22 will cool off to a similar temperature as the ambient air, resulting in little or no temperature differential between the ambient air and the heat source 22 for driving the engine 10. Accordingly, the engine 10 will tend to come to rest once its rotational inertia is expended.

In other embodiments, a brake (e.g. mechanical, magnetic, hydraulic, capacitive, etc.) could also be used to slow and/or stop the engine 10.

The vessels 18 can generally have any suitable construction. For example, the vessels 18 could be spherical, cylindrical, drop shaped, rectangular, or have any other suitable shape.

In some embodiments, the vessels 18 may have one or more fins 166 sized and shaped so as to enhance heat transfer between the vessels 18 and the heat source 22 and/or between the vessels 18 and the ambient air.

In some embodiments, resistance to movement of the vessels 18 through the heat source 22 (e.g. drag forces) should be taken into account when selecting the size and shape of the vessels 18. For example, a teardrop-shaped vessel 18 may be selected to help reduce drag between the vessels 18 and the heat source 22.

The vessels 18 can be made of any material suitable for the pressures and temperatures involved during operation of the engine 10. For example, steel, copper, aluminium, glass, and plastic may be suitable materials, depending on the working fluid and the type of heat source. Composite materials, such as carbon fibre or steel covered in a thermoplastic layer (e.g. to inhibit rust), may also be suitable.

The thermal conductivity of the vessels 18 can be selected to help encourage, delay or generally synchronize the boiling of the liquid inside the vessels 18. For example, if boiling should be delayed to increase or maximize the benefits of buoyancy (see above), a more insulative material may be selected for the vessels 18. Alternatively, if boiling should to be hastened, a more thermally conductive material can be used for the vessels 18.

The conduits 16 can also be made of any material suitable for the pressures and temperatures involved during operation of the engine 10. For example, the conduits 16 could be made of commercially available round or rectangular tubing (e.g. plastic of PVC tubing, copper tubing, etc). The materials generally suitable for the vessels 18 may also be suitable for the conduits 16. In some embodiments, the conduits 16 can be straight (as shown in FIG. 1), or alternatively may have curved or stepped paths or shapes. In some embodiments, the conduits 16 could include flexible hoses (e.g. where another frame member is used to secure the vessels 18 to the shaft 14).

In some embodiments, the conduits 16 and vessels 18 can be joined using any suitable conventional process depending on the materials used. For example, the conduits 16 and vessels 18 could be joined using threaded connections, brazing, welding, soldering, gluing, bonding, ultrasonic welding, mechanical compression fit, crimping rings, etc. In some embodiments, the vessels 18 and conduits 16 could be integrally made and need not be separate components.

In some embodiments, the check valves 28 may be commercially available check-valves (e.g. ball and spring valves) selected so as to be suitable for the working temperatures and pressures within the engine 10.

The flow of the fluids within the conduits 16 is generally restricted by the check valves 28 and by the conduit-vessel connections, as will be explained with respect to FIGS. 3a-b and 4a-b. In FIGS. 3a-b and 4a-b, several elements including the support 12 as well as other elements have been omitted for greater clarity.

For example, FIG. 3a shows a vessel 18 and its two connected conduits 16, an inlet conduit 162 and an outlet conduit 164. The inlet conduit 162 is connected with the wall of the vessel 18, while the outlet conduit 164 has an end 164a that extends into the vessel 18 so as to define a gas trap 32 within the vessel 18.

In the orientation shown, gravity causes the liquid 30 to collect around the bottom of the vessel 18. As the liquid 30 boils or vaporizes (e.g. due to the heat received from the heat source 22), the pressure in the gas trap 32 increases since the gas therein cannot escape past the check valve 28.

FIG. 3b shows a substantial portion of the liquid 30 being pushed up the outlet conduit 164 by the increasing pressure in the gas trap 32. The liquid and vapour cannot escape via the inlet conduit 162 because of the check valve 28.

Figure 4A:
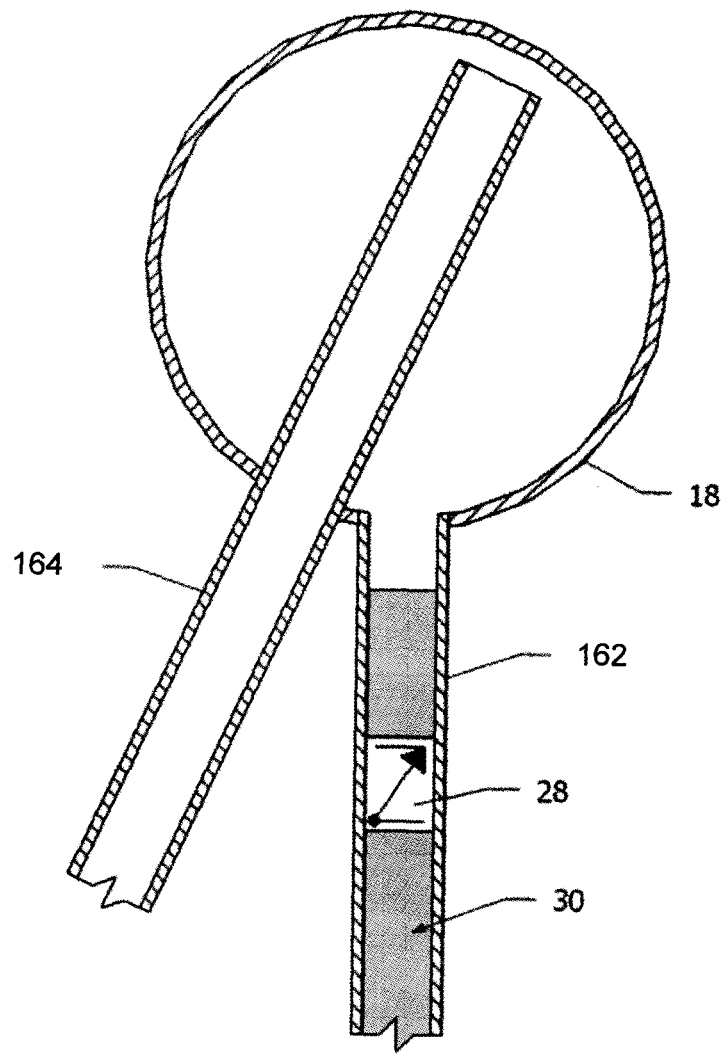
FIGS. 4a-b are cross-sectional views of a higher vessel and its connected conduits of the engine of FIG. 1.

FIG. 4a shows a higher vessel 18 being fed by the outlet conduit 164 of the lower vessel 18 of FIGS. 3a-b. The outlet conduit 164 for the lower vessel 18 is coupled to the inlet conduit 162 for the higher vessel 18 shown in FIG. 4a. As shown, the liquid being forced upwards passes through the check valve 28.

Figure 4B:
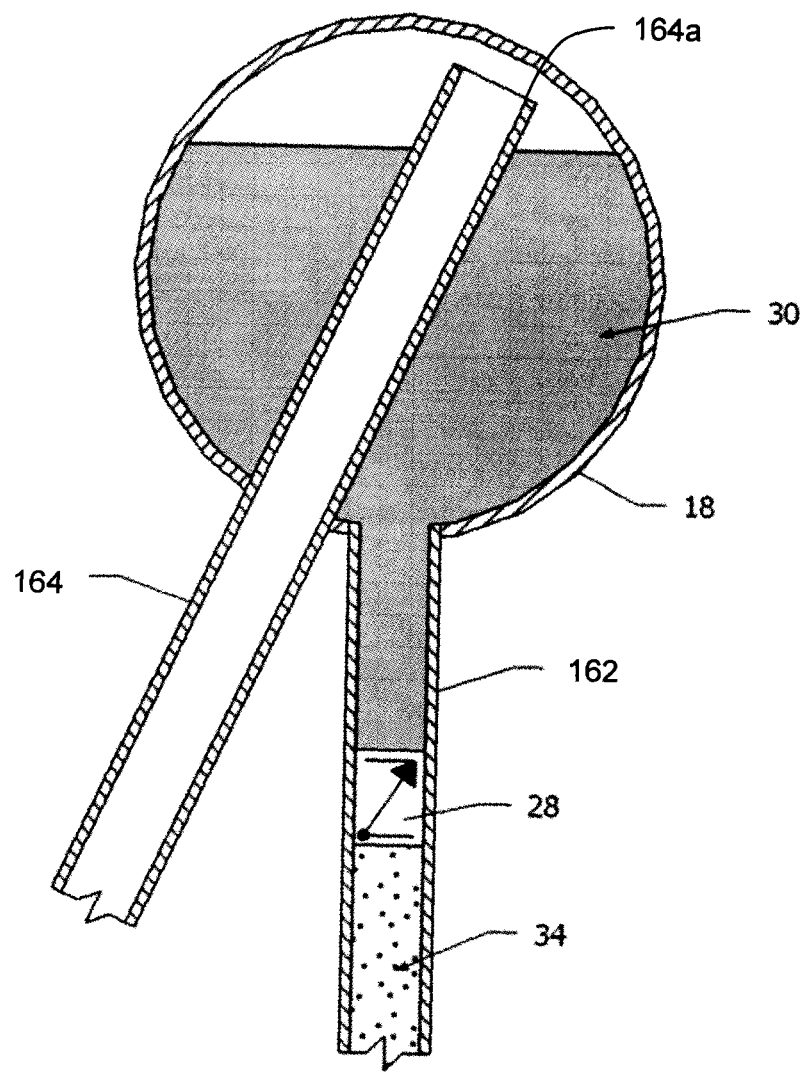

In FIG. 4b, the liquid 30 has continued to flow into the higher vessel 18 by the pressurized vapour 34. The liquid 30 cannot escape the vessel 18 because it has not yet reached the end 164a of the outlet conduit 164. A small amount of escaping liquid would generally not be a significant problem, as long as a substantial portion of the liquid remains within the vessel 18. The liquid 30 within this vessel act downwards due to the force of gravity, causing the engine 10 to rotate.

Figure 5:
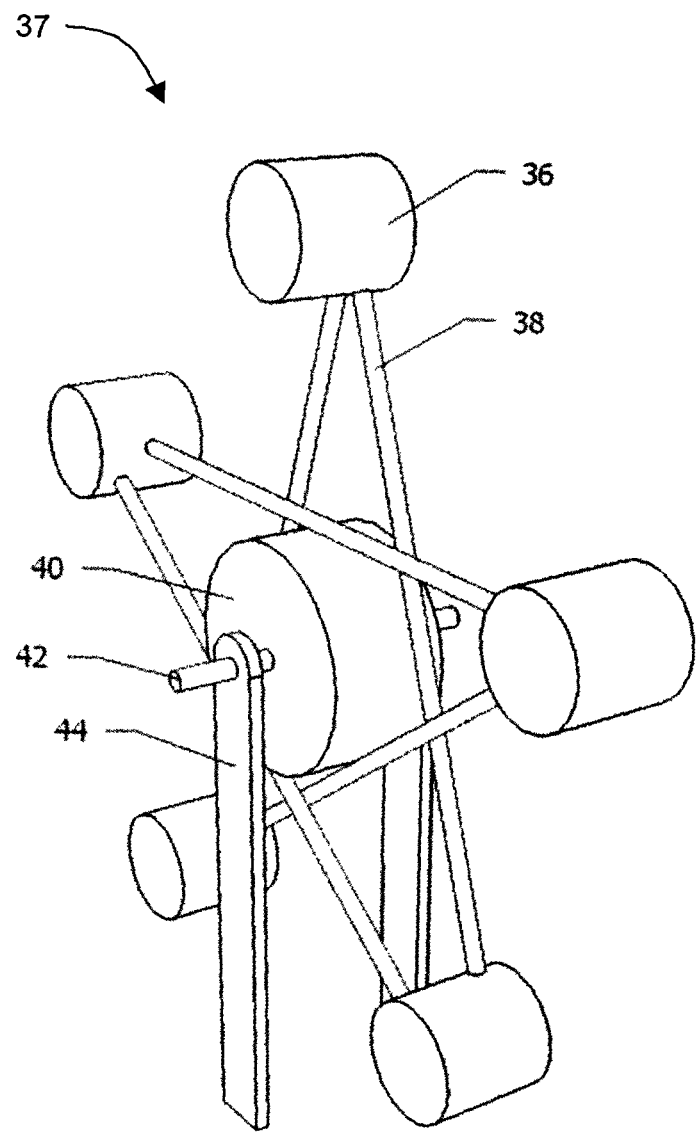
FIG. 5 is a perspective view of an engine according to another embodiment.

Turning now to FIG. 5, illustrated therein is another engine 37 according to another embodiment. The engine 37 includes five cylindrical vessels 36 connected by five conduits 38. Each conduit has a check valve (not shown) and the conduits 38 and vessels 36 are connected together generally as in the previous embodiment. The conduits 38 are connected to a central drum 40 through which a shaft 42 extends. The shaft 42 in turn is rotatably supported on either side of the drum 40 by a pair of supports 44. A heat source (not shown) is provided in the area below the shaft 42 (generally similar to the heat source 22).

In some embodiments, the drum 40 can be a light-weight hollow structure, or alternatively can be a heavier structure, such as a fly-wheel. It could be replaced by a light-weight frame. If implemented as a heavy fly-wheel, the drum 40 may tend to greatly increase the rotational inertia of the engine 37, which may be beneficial in certain applications.

In some embodiments, the drum 40 may serve as a source of cooling which interfaces with the conduits 38 and the liquid/vapour therein as it passes between vessels 36. In some embodiments, power could be taken off the drum 40, and so the drum 40 is another example of a rotational member through which the engine 37 can provide power.

Note that as shown in FIG. 5, the conduits 38 may be offset from each other (generally along the axis of the shaft 42) so as to avoid interference between the conduits 38 when they criss-cross.

Figure 6:
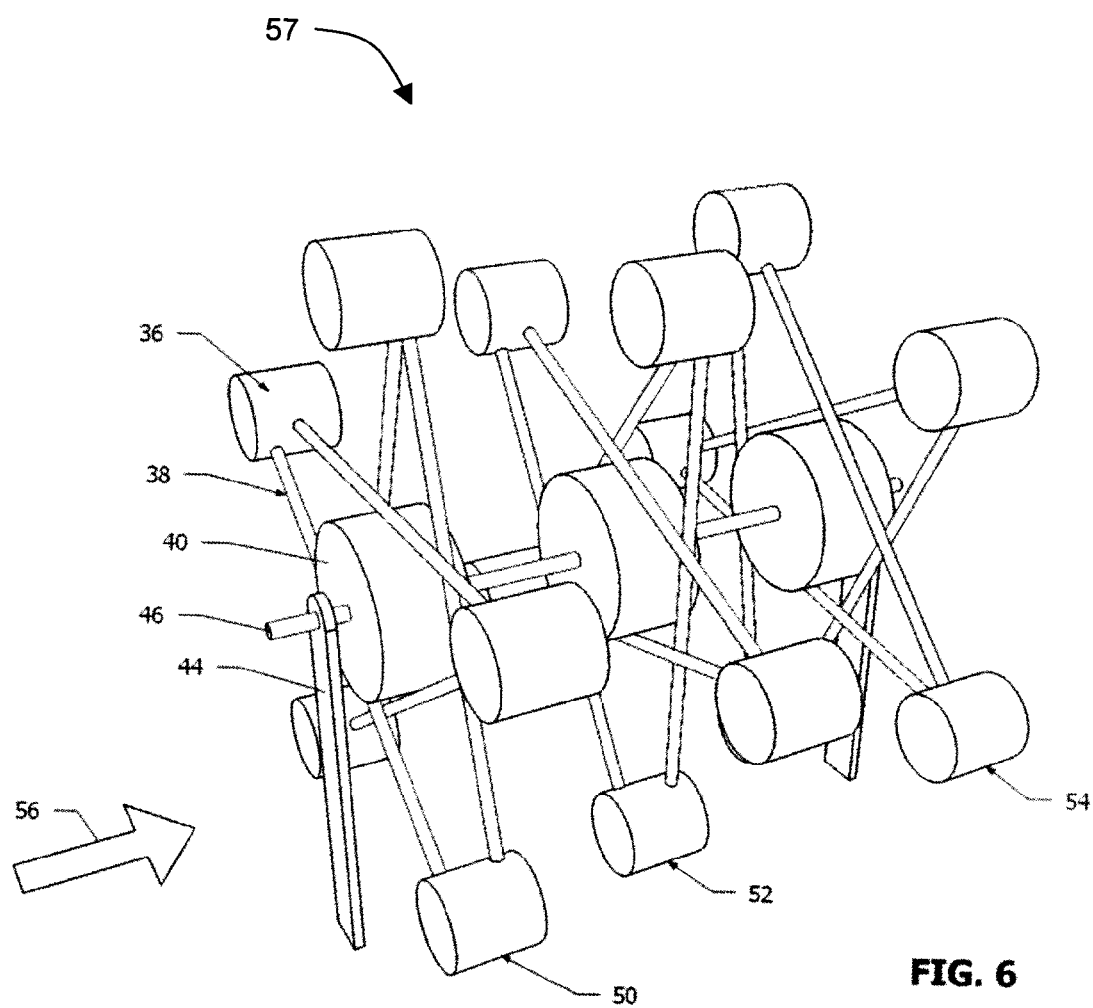
FIG. 6 is a perspective view of a multi-stage engine according to yet another embodiment.

Turning now to FIG. 6, illustrated therein is a multi-stage engine 57 according to another embodiment. The engine 57 generally includes three wheel-like assemblies 50, 52, 54 (or "stages") connected in series to a common shaft 46.

As shown, the three wheel-like assemblies 50, 52, 54 are fixed to the shaft 46 at different rotational angles, although they could be fixed at the same or a substantially similar angle. This arrangement may be useful to help draw more power from a heat source (e.g. a larger bath of warm water).

Moreover, if the liquid heat source is flowing in the direction of arrow 56, then each of the three wheel-like assemblies 50, 52, 54 may be used to draw energy from the liquid heat source in a stage-like manner. For example, each wheel-like assembly 50, 52, 54 will tend to reduce the temperature of the flowing liquid heat source, and the wheel-like assemblies 50, 52, 54 can be configured or optimized by having different working fluids (e.g. liquid-vapour mixtures) therein.

For example, the first-stage wheel-like assembly 50 generally engages the heat source when the heat source is at its highest temperature. Accordingly, the first-stage assembly can be provided with a working fluid having a higher boiling point. Conversely, the third-stage wheel-like assembly 54, which engages the heat source at the lowest temperature, can be provided with a working fluid having a lower boiling point. Finally, the middle wheel-like assembly 52 may have a working fluid having an intermediate boiling point (e.g. between the higher and lower boiling temperatures).

In the embodiment shown in FIG. 6, the drums 40 of the wheel-like assemblies are fixed to the common shaft 46. However, in other embodiments, the shaft 46 may be connected to each drum 40 by a coupling that allows independent rotation of the drum 40 and shaft 46, while still transferring power from the drum 40 to the shaft 46. Examples of such couplings include elliptical bearings and fluid couplings. Such a coupling may allow the wheel-like assemblies to rotate at different rates while contributing power to the common shaft 46.

In some embodiments, the wheel-like assemblies 50, 52, 54 can configured to rotate in different directions (e.g. the first assembly 50 and last or third assembly 54 could rotate in a clockwise direction, while the second assembly 52 could rotate in a counter-clockwise direction) while still contributing power to the shaft 46 (e.g. by way of known gear systems and/or other couplings). Different directions of rotation may help to reduce imbalanced torque, and gyroscopic or rotational momentum effects which otherwise might exert undesired forces on the support 12.

In some embodiments, the centralized drums 40 may be interconnected to be only one structure, and which in turn could function as both a drum and larger diameter hollow shaft.

Figure 7:
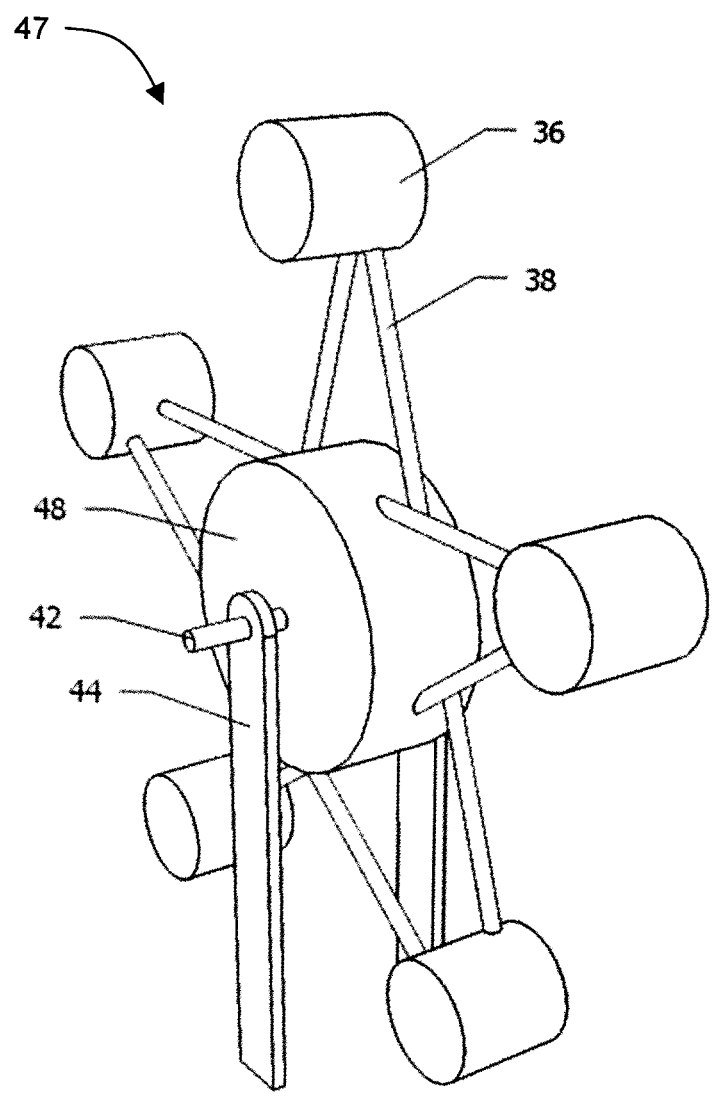
FIG. 7 is a perspective view of an engine having a central cooling drum according to yet another embodiment.

Turning now to FIG. 7, illustrated therein is an engine 47 according to another embodiment. The engine 47 may be similar to the engine 37 as shown in FIG. 5. In this embodiment, engine 47 has a larger drum 48, and the conduits 38 extend through (and/or interface with) the drum 48.

The drum 48 in this embodiment may contain a cooling fluid that serves to cool the liquid/vapour as it travels through the conduits 38. The drum 48 can help to dissipate the heat collected by the cooling fluid therein and/or the cooling fluid can be recirculated through the drum 48. The cooling fluid in the drum 48 can help to modulate or manage the temperature of the working fluid (e.g. liquid-vapour mixture), as desired.

Figure 8:
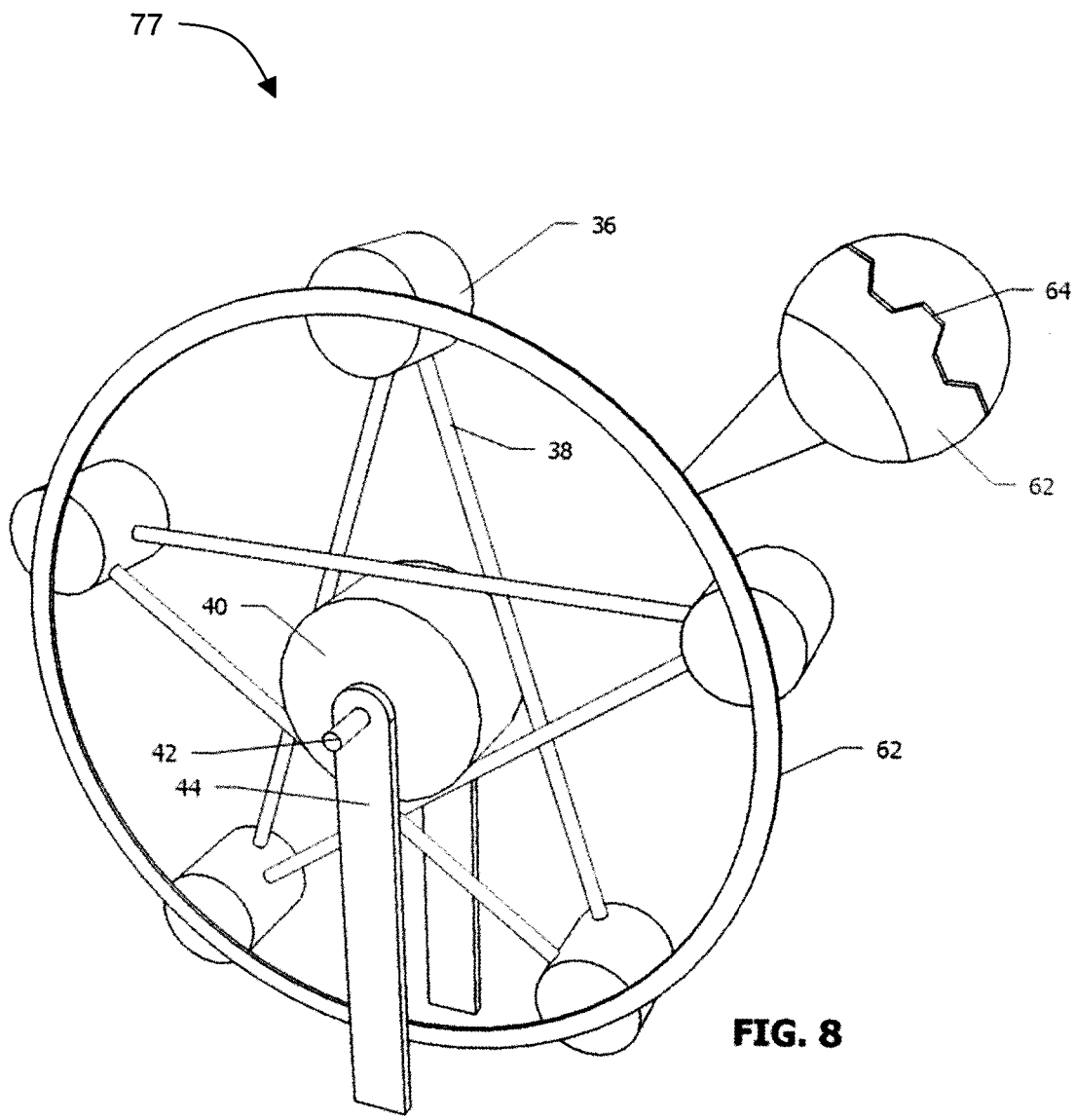
FIG. 8 is a perspective view of an engine having an annular rotational member according to yet another embodiment.

Turning now to FIG. 8, illustrated therein is an engine 77 according to yet another embodiment. The engine 77 is also similar to the engine 37 as shown in FIG. 5. However, one difference is that an annular member 62 is connected to the vessels 36 in engine 77.

The annular member 62 may have gear teeth 64 or other engagement members and may be used to provide power to a gear or other similar device (not shown) that can be meshed with the teeth 64. This type of toothed annular member is sometimes known as a ring gear.

In the embodiment shown in FIG. 8, the teeth 64 are provided on the outside perimeter of the annular member 62. In other embodiments, the teeth 64 can be located on the inside perimeter of the annular member 62, or on both the inside and outside perimeters. In some embodiments, the annular member 62 can be part of a planetary gear system. The annular member 62 is another example of a rotational member from which power can also be taken, and accordingly power need not necessarily be taken from the shaft 42.

Referring back to FIG. 6, in other embodiments, one or more of the assemblies 50, 52, 54 (e.g. the middle wheel-like assembly 52) may be replaced by the wheel-like assembly shown in FIG. 8, so as to provide a multi-stage engine having two rotational members (i.e., shaft 46 and annular member 62) from which power can take taken. This is an example of two or more rotational members that may in some embodiments rotate at different speeds, torques, or power outputs, etc.

Figure 9:
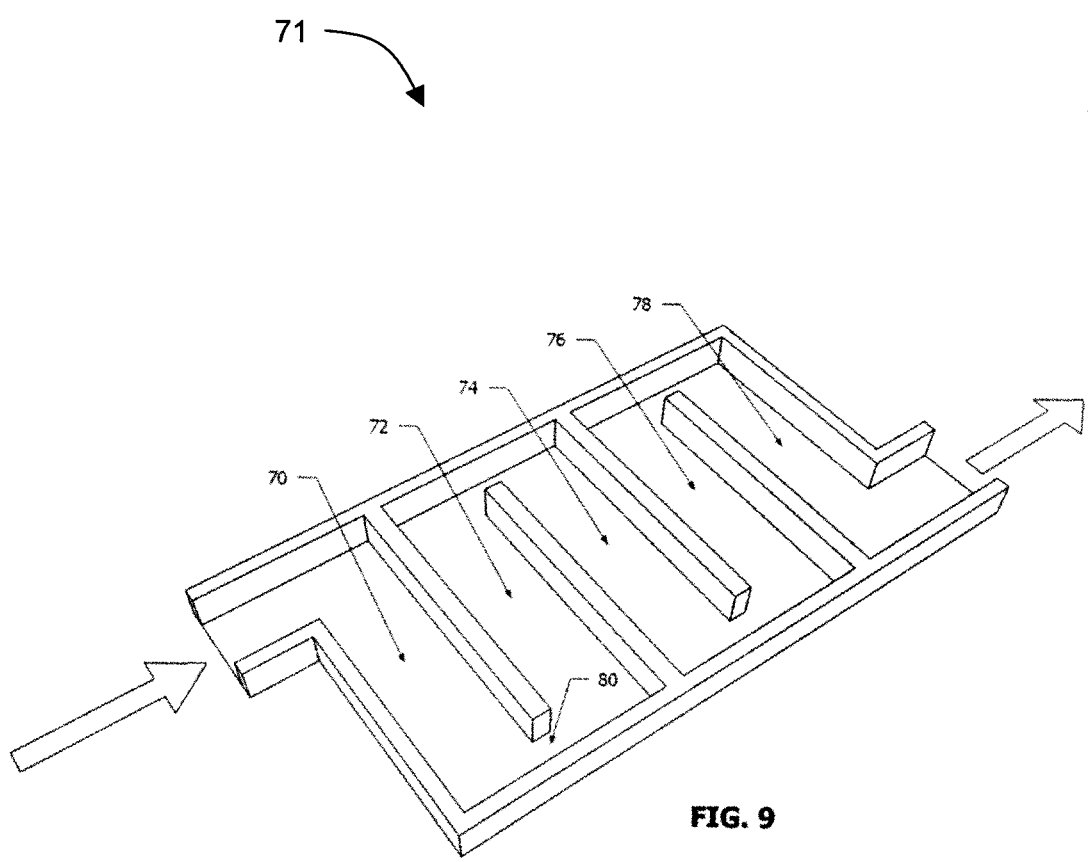
FIG. 9 is a perspective view of a trough for use with a multi-stage engine, such as the engine of FIG. 6, according to yet another embodiment.

Turning now to FIG. 9, illustrated therein is a trough 71 for use with a multi-stage engine, such as the multi-stage engine 57 shown in FIG. 6. As shown, water or another liquid heat source generally flows through legs or channels 70, 72, 74, 76 and 78 of the trough 71, as generally indicated by the arrows. Flow can be achieved by pumping the water or by sloping the trough 71 so as to encourage the flow thereof.

In some embodiments, as shown, the legs or channels 70, 72, 74, 76 and 78 of the trough 71 may be arranged in a zigzag or switchback configuration so that the water in adjacent legs or channels 70, 72, 74, 76 and 78 flows in opposite directions.

During use, each stage of a multi-stage engine (e.g. engine 57) may be used to draw heat energy from one of the legs or channels 70, 72, 74, 76 and 78.

For example, if a multi-stage engine has three stages (e.g. stages 50, 52, and 54) that rotate in the same direction, the stages can be associated with legs or channels 70, 74, and 78 so as to encounter water flowing the same direction as the vessels in each stage. Similarly, if the multi-stage engine has five stages, and alternating stages rotate in opposite directions, then each of the stages can be associated with one of the legs or channels 70, 72, 74, 76, and 78 so as to encounter water flowing the same direction as the vessels in each stage.

In some embodiments, if the flow of the liquid heat source is slow enough so that the flow does not significantly affect the rotation of the engine stages (for example, where any increased drag effects due to the movement of the water are negligible), then one or more stages could be configured to rotate against the direction of the flow of the water. For example, a five-staged engine with each stage rotating in the same direction can be provided within the legs or channels 70, 72, 74, 76, and 78 of the trough In some embodiments, other trough configurations with more legs or channels or fewer legs or channels are also possible.

Generally, flow in the direction of rotation of an engine stage may allow harvesting of kinetic energy from the flow (like a water wheel), while flow opposite the direction of rotation may increase turbulence in the heat source which may help to increase heat transfer from the heat source to the vessels.

In some embodiments, one or more valves or baffles can be provided in the flow (e.g. generally anywhere in the trough 71 such as at the connections 80 between the legs 70, 72, 74, 76, and 78). The valves and/or baffles can help to regulate the flow and generally help control the movement of the liquid heat source.

In some embodiments as discussed herein, the heat source used to drive the engine may be a liquid, such as water having a temperature that is warmer than the ambient temperature. However, this is merely one example of a low differential temperature source that may be used to drive an engine. In some cases, such water can be heated by solar or geothermal, ocean thermal, biomass energy or can be water heated by some industrial, institutional, or residential processes (e.g. waste water from an industrial operation). In some embodiments, the vessels can be partially or fully immersed in such liquid. In some embodiments, the liquid can be stationary, moving, or recirculated.

In some embodiments, one or more of the engines as generally described herein may be stationary and/or may be mobile (e.g. an engine may be mounted on a vehicle capable of movement).

In some embodiments, the heat source could also be a radiant heat source, such as solar energy that may be directed, or focused with a lens or magnifying device, and/or reflected by a mirror for example, to heat the lower vessel(s).

In some embodiments, the heat source could be a conductive heat source, such as the heat from a heat exchanger, or could be a convective heat source, such as from a heated stream of air or steam, or a fan that is targeted to heat the vessels in the desired rotational position.

Generally, the embodiments of the engines as described herein can extract energy from any suitable heat source, be it conductive, convective, radiant, or a combination thereof.

The heat source is the primary driving force that causes the working fluid to warm up and generate a vapour pressure that causes liquid to be conveyed to a position of some higher elevation. In this higher position, the working liquid will have a higher potential energy that can be converted to kinetic energy to drive the engine.

In some embodiments, the output of the engines as generally described herein can be taken as rotational power from the shaft or other rotational members. Any suitable device using rotational power can be connected to the shaft or other rotational members. Such devices could include, for example, generators, alternators, Sterling engines, pumps, and compressors.

Thus, electrical, thermal, or mechanical power can be generated using the engines as generally described herein. In addition, the output torque and speed from the shafts and other rotating members could be adjusted and tailored through various gear systems, hydraulic couplings, planetary gear systems, and various other techniques as desired.

Generally, in some embodiments, heat may be drawn out from a source that is gradually cooled. As such, one of the outputs from the system can be a cooled heat source (e.g. fluid) while at the same time the energy that was extracted from the fluid may be used to generate torque, electricity or for other uses.

In some embodiments, the cooled fluid is a by-product that can be used for other applications. For example, the by-product of Photovoltaic (PV) solar systems is a warm fluid that can be used by one or more engines as generally described herein to generate power, while at the same time the cooled fluid that is outputted may be useful as a cooling medium to further cool the PV systems.

Although in some embodiments the overall configuration is shown as a "wheel" with a series of elements rotating about a central axis, this is not the only possible arrangement, and the wheel arrangement is merely an example.

As mentioned, the working fluid in the vessels and conduits can be a single fluid with a desired boiling point. It may also be possible to mix two or more fluids together, such as one fluid that boils at a lower temperature (e.g. ethanol) with a second fluid having a higher boiling temperature (e.g. water) that could be driven upward through the conduits.

In such embodiments, the second fluid would have a higher boiling point and as such may primarily remain as a liquid. One such combination could be an alcohol and water combination. Isopropanol alcohol with its lower boiling point and lower density would tend to float on top of the water, and once exposed to heat, it would boil and drive the water upward to the next vessel.

In some embodiments, the engine can be optimized based on the input temperature of the heat source for the various individual stages of the working fluid. Where the second fluid is water or some heavier fluid, this may help generate more potential energy than if the same quantity of alcohol or a lighter fluid was conveyed upward In some embodiments, dissolving or suspending a soluble or insoluble additive to further increase the density of the mixture in the vessels and conduits that is being conveyed upward may also increase the mass and resulting gravitational and buoyancy moment and thus may increase the rotational kinetic energy of the engine.

An example of one such an additive is table salt (NaCl), which could be added to water, and which will tend to increase the density and change the boiling point of the water. Other density increasing additives could include suspensions, slurries, and colloids, such as metallic or mineral particles mixed with water. Other additives may be used that do not affect density significantly, but only change the boiling point.

In some embodiments, different working fluids may be used depending on the temperature of the heat source. For instance at low ambient temperatures (e.g. during a North American winter) where the heat source may be geothermal, the working fluid may be liquid carbon dioxide, or a combination fluid having a phase-changing portion and a mass portion that is conveyed upward to generate potential energy.

While the above description provides examples of one or more methods and/or apparatuses, it will be appreciated that other methods and/or apparatuses may be within the scope of the present description as interpreted by one of skill in the art.

The invention claimed is:

1. An engine for extracting energy from a heat source, comprising:
 a shaft adapted to be rotatably coupled to a support and being rotatable in a first direction; and
 a plurality of stages,
 each of the stage having:
 a plurality of vessels coupled to and spaced about the shaft, one or more of the plurality of vessels comprising thermally insulative material, and thermally conductive material thereon sized and shaped to enhance heat transfer;
 a plurality of conduits connecting the plurality of the vessels of the each stage together, each conduit having one end connected to one of the plurality of vessels and another end connected to another one of the plurality of vessels;

a working fluid provided in the each stage is different from the other stages, and the working fluid in each of the stage has a different boiling point such that when the working fluid in one of the plurality of vessels is heated by the heat source, the working fluid in one of the plurality of vessels experiences an increase in vapour pressure causing at least part of the working fluid to flow from the one of the plurality of vessels into another of the plurality of vessels located above the one of the plurality of vessels to produce a gravitational moment that encourages rotation of the shaft in the first direction; and hollow structures adapted to rotate with the each stage, the each stage independently rotatable about the shaft from each of the other stages, and containing cooling fluid to modulate the temperature of working fluid in each stage.

2. The engine of claim 1, wherein one or more of the vessels are made of a composite of materials, and the thermally conductive material thereon comprises one or more fins.

3. The engine of claim 1, wherein the thermal conductivity of the vessels is selected to encourage, delay or generally synchronize the vaporization of the working fluid.

4. The engine of claim 1, wherein the plurality of conduits connect the vessels together in a circuitous fluid circuit, and interface with or extend through the one or more hollow structures.

5. The engine of claim 1 further comprising a valve to control flow of the working fluid between at least two of the vessels.

6. The engine of claim 1 further comprising a fly-wheel connected to at least one of the vessels, at least one of the conduits, or the shaft.

7. The engine of claim 1, wherein the working fluid includes a density-increasing additive.

8. The engine of claim 1, wherein the working fluid includes an additive selected to modify the boiling point of the working fluid.

9. The engine of claim 1, wherein the working fluid comprises two or more different fluids, the two or more different fluids comprising a first fluid and a second fluid, wherein the first fluid vaporizes and drives the second fluid upward through the conduits.

10. The engine of claim 9, wherein the second fluid primarily remains as a liquid.

11. The engine of claim 9, wherein the second fluid has a higher boiling temperature than the first fluid.

12. The engine of claim 1, wherein the heat source is a flowing liquid.

13. The engine of claim 1, wherein the plurality of conduits include flexible hoses.

14. The engine of claim 1, wherein the engine is configured to be used to generate at least one of electrical, thermal or mechanical power.

15. The engine of claim 1, wherein the shaft is adapted to be coupled to an energy extraction means.

16. An engine for extracting energy from a heat source, comprising:

a shaft adapted to be rotatably coupled to a support and being rotatable in a first direction; and a plurality of stages, each of the stage having:

a plurality of vessels coupled to and spaced about the shaft, one or more of the vessels comprising thermally insulative material and thermally conductive material thereon sized and shaped to enhance heat transfer;

two or more different working fluids provided in the plurality of vessels of the each stage, the two or more different working fluids comprising a first working fluid and a second working fluid; and a plurality of conduits connecting the plurality of the vessels of the each stage together, each conduit having one end connected to one of the plurality of vessels and another end connected to another one of the plurality of vessels;

the first and second working fluids having different boiling points, such that when the first working fluid in the one of the plurality of vessels is heated by the heat source, the first working fluid in the one of the plurality of vessels vaporizes causing at least part of the second working fluid to flow from the one of the plurality of vessels into another of the plurality of vessels located above the one of the plurality of vessels to produce a gravitational moment that encourages rotation of the shaft in the first direction, and wherein the second working fluid primarily remains as a liquid; and hollow structures adapted to rotate with the each stage, the each stage independently rotatable about the shaft from each of the other stages, and containing cooling fluid to modulate the temperature of working fluid in each stage.

17. The engine of claim 16, wherein the thermal conductivity of the vessels is selected to encourage, delay or generally synchronize the vaporization of the first working fluid.

18. The engine of claim 16, wherein the plurality of conduits connect the vessels together in a circuitous fluid circuit, and interface with or extend through the one or more hollow structures.

19. The engine of claim 1, wherein each stage is independently rotatable about the shaft in opposite directions.

* * * * *